US008624877B2

(12) United States Patent
Lai et al.

(10) Patent No.: US 8,624,877 B2
(45) Date of Patent: Jan. 7, 2014

(54) OPTICAL TOUCH DISPLAY APPARATUS AND OPTICAL OPERATION APPARATUS

(75) Inventors: Hung-Ching Lai, Hsinchu (TW); Wu-Chieh Liu, Hsinchu (TW); Hui-Hsuan Chen, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 214 days.

(21) Appl. No.: 13/027,840

(22) Filed: Feb. 15, 2011

(65) Prior Publication Data
US 2011/0279413 A1 Nov. 17, 2011

(30) Foreign Application Priority Data

May 11, 2010 (TW) .............................. 99114977 A
Sep. 21, 2010 (TW) .............................. 99132086 A

(51) Int. Cl.
*G06F 3/042* (2006.01)

(52) U.S. Cl.
USPC ......... 345/175; 345/102; 345/173; 178/18.01

(58) Field of Classification Search
USPC ............. 345/102, 173–179; 178/18.01–18.09
See application file for complete search history.

(56) References Cited

U.S. PATENT DOCUMENTS

| 5,424,533 | A | 6/1995 | Schmutz |
| 6,803,906 | B1 | 10/2004 | Morrison et al. |
| 7,701,448 | B2 | 4/2010 | Nakamura et al. |
| 2004/0032388 | A1* | 2/2004 | Tsai et al. ..................... 345/102 |
| 2007/0296688 | A1 | 12/2007 | Nakamura et al. |
| 2009/0073142 | A1* | 3/2009 | Yamashita et al. ............ 345/176 |
| 2009/0141002 | A1* | 6/2009 | Sohn et al. .................... 345/175 |
| 2010/0134446 | A1* | 6/2010 | Lin et al. ...................... 345/175 |
| 2010/0271333 | A1* | 10/2010 | Lai ................................ 345/175 |

FOREIGN PATENT DOCUMENTS

| CN | 101819340 | 9/2010 |
| JP | 2008003296 | 1/2008 |
| TW | 200525436 | 8/2005 |

* cited by examiner

*Primary Examiner* — Amare Mengistu
*Assistant Examiner* — Premal Patel
(74) *Attorney, Agent, or Firm* — WPAT, PC; Justin King

(57) ABSTRACT

An optical touch display apparatus includes a light-transmitting display panel, a backlight module, a visible light source, an invisible light source, an image sensing apparatus and a processing circuit. The light-transmitting display panel has a first surface and a second surface opposite to each other. The first surface has a display area. The backlight module is disposed on the second surface. The image sensing apparatus is configured to sense an image above the display area. When a pointer is located in the display area and reflects invisible light which passes through the display area so that the image sensing apparatus senses the invisible light reflected by the pointer, the processing circuit calculates the position of the pointer related to the display area according to the image sensed by the image sensing apparatus. In addition, an optical operation apparatus is also provided.

11 Claims, 5 Drawing Sheets

OPTICAL TOUCH DISPLAY APPARATUS AND OPTICAL OPERATION APPARATUS

This application claims the priority benefit of Taiwan provision patent application serial no.099114977, filed on May 11, 2010, and claims the priority benefit of Taiwan application serial no. 099132086, filed on Sep. 21, 2010, and the entire contents of the two applications are hereby incorporated by reference.

FIELD OF THE INVENTION

The present invention relates to a touch display apparatus, and more particularly to an optical touch display apparatus.

BACKGROUND OF THE INVENTION

Touch display apparatuses are easily to operate, so that in recent years the touch display apparatuses have been widely used in many electronic products such as mobile phones, personal digital assistants (PDA), digital cameras, music players, computers, satellite navigation devices and so on.

According to sensing theory, touch display apparatuses can be divided into many types such as resistive type, capacitive type and optical type. In a conventional optical touch display apparatus, a frame made of reflecting material, light-emitting material or light guide material is added to surround display area to emit background light. Thus, the said conventional optical touch display apparatus can calculate the position of a pointer related to the display area according to the shade position of the pointer related to the background light.

However, since the mechanical flatness of the frame is not good or the frame is bended, the conventional optical touch display apparatuses may have a problem of misjudging the position of the pointer.

SUMMARY OF THE INVENTION

The present invention relates to an optical touch display apparatus.

The present invention also relates to an optical operation apparatus.

The present invention provides an optical touch display apparatus. The optical touch display apparatus has a light-transmitting display panel, a backlight module, a visible light source, an invisible light source, an image sensing apparatus and a processing circuit. The light-transmitting display panel has a first surface and a second surface opposite to each other. The first surface has a display area. The backlight module is disposed on the second surface. The visible light source is configured to emit visible light to the backlight module so that the backlight module guides the visible light entering the inner thereof to the second surface. The invisible light source is configured to emit invisible light to the backlight module so that the backlight module guides the invisible light entering the inner thereof to the second surface. The image sensing apparatus is configured to sense an image above the display area. When a pointer is located in the display area and reflects invisible light which passes through the display area so that the image sensing apparatus senses the invisible light reflected by the pointer, the processing circuit calculates the position of the pointer related to the display area according to the image sensed by the image sensing apparatus.

In one embodiment of the optical touch display apparatus of the present invention, the backlight module has four side surfaces. The visible light source and the invisible light source are disposed beside the same side surface of the four side surfaces or are respectively disposed beside two side surfaces of the four side surfaces. Among the four side surfaces of the backlight module, the side surface facing the visible light source and the side surface facing the invisible light source are light-transmitting surfaces, and the other side surfaces are non-light-transmitting surfaces or reflecting surfaces.

In one embodiment of the optical touch display apparatus of the present invention, the light-transmitting display panel has a liquid crystal layer therein. The backlight module has a reflecting portion therein. The reflecting portion is extended to the side surfaces of the backlight module which do not face the visible light source and the invisible light source, so as to make the side surfaces be non-light-transmitting surfaces.

In one embodiment of the optical touch display apparatus of the present invention, a portion of the reflecting portion which is opposite to the second surface of the light-transmitting display panel has a pattern. The pattern is used for guiding the received light to the second surface, so that the visible light and the invisible light entering the inner of the backlight module can pass through the light-transmitting display panel, the liquid crystal layer inside the light-transmitting display panel, and the display area.

The present invention also provides an optical operation apparatus. The optical operation apparatus includes a light-transmitting panel, a backlight module, a first light source, an image sensing apparatus and a processing circuit. The light-transmitting panel has a first surface and a second surface, and the first surface and the second surface are opposite to each other. The backlight module is disposed on the second surface. The first light source is configured to provide a first light to the backlight module so that the backlight module guides the first light entering the inner thereof to the second surface. The image sensing apparatus is configured to sense an image above the first surface so as to generate sensing information. The processing circuit is configured to generate object information according to the sensing information.

In one embodiment of the optical operation apparatus of the present invention, the first light provided by the first light source is invisible light, and the first light source includes an infrared light source.

In one embodiment of the optical operation apparatus of the present invention, the optical operation apparatus further includes a second light source configured to provide a second light to the backlight module so that the backlight module guides the second light entering the inner thereof to the second surface. The second light is visible light.

In one embodiment of the optical operation apparatus of the present invention, the light-transmitting panel further has a liquid crystal layer.

In one embodiment of the optical operation apparatus of the present invention, the sensing information includes a complete image or brightness distribution information.

In one embodiment of the optical operation apparatus of the present invention, the backlight module has four side surfaces. The first light source is disposed beside a side surface of the four side surfaces. Among the four side surfaces of the backlight module, the side surface facing the first light source is a light-transmitting surface, and the other side surfaces are non-light-transmitting surfaces or reflecting surfaces.

In one embodiment of the optical operation apparatus of the present invention, the backlight module has a light guide unit therein, and the light guide unit is configured to guide the first light entering the backlight module to the second surface.

Compared to the conventional light-transmitting display apparatus, the optical touch display apparatus provided by the present invention further includes the invisible light source, the image sensing apparatus and the processing circuit, and the invisible light emitted by the invisible light source is guided to the surface between the light-transmitting display panel and the backlight module by the conventional backlight module, so that the invisible light can pass through the light-transmitting display panel and the display area thereof. Thus, when a pointer is located in the display area and reflects the invisible light which passes through the display area so that the image sensing apparatus can sense the invisible light reflected by the pointer, the processing circuit calculates the position of the pointer related to the display area according to the image sensed by the image sensing apparatus.

The optical operation apparatus provided by the present invention is consisted of the light-transmitting panel, the backlight module, the light source, the image sensing apparatus and the processing circuit. The light-transmitting panel has the first surface and the second surface, and the first surface and the second surface are opposite to each other. The backlight module is disposed on the second surface. The light source is configured to provide light to the backlight module, so that the backlight module can guide the light entering the inner thereof to the second surface. The image sensing apparatus is configured to sense an image above the first surface, so as to generate sensing information. The processing circuit generates object information according to the sensing information.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Figure 1:
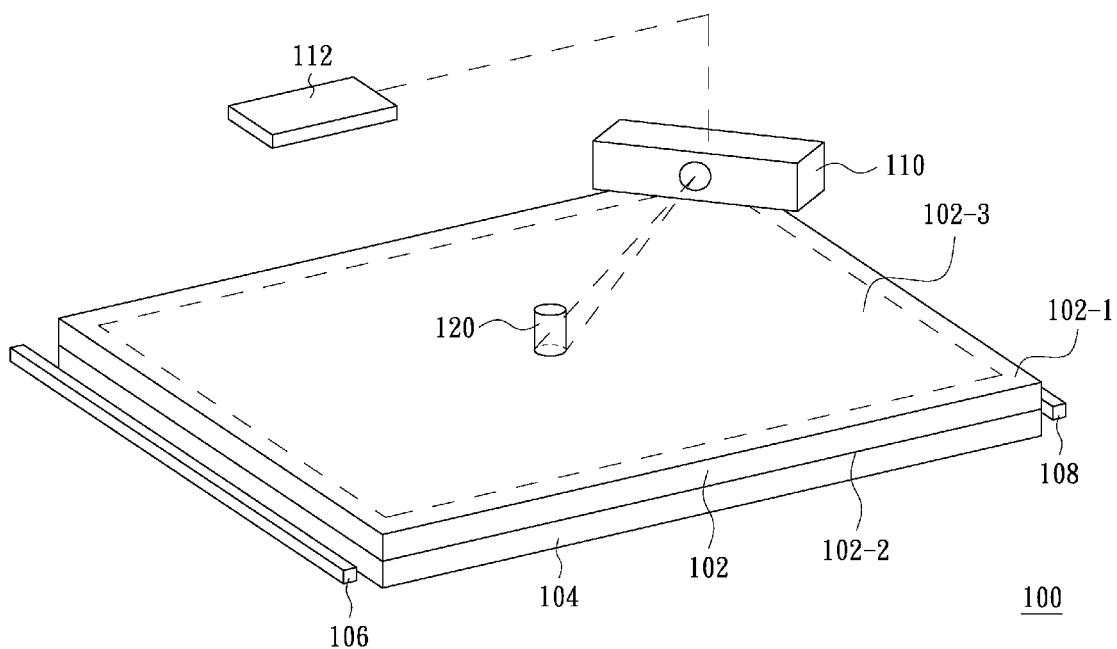
FIG. 1 is a three-dimensional schematic view of an optical touch display apparatus according to an embodiment of the present invention.

FIG. 1 is a three-dimensional schematic view of an optical touch display apparatus according to an embodiment of the present invention. Referring to FIG. 1, the optical touch display apparatus 100 includes a light-transmitting display panel 102, a backlight module 104, a visible light source 106, an invisible light source 108, an image sensing apparatus 110 and a processing circuit 112. The light-transmitting display panel 102 has a first surface 102-1 and a second surface 102-2. The first surface 102-1 and the second surface 102-2 are opposite to each other, and the first surface 102-1 has a display area 102-3. In the present embodiment, the shape of the display area 102-3 is quadrilateral, and rectangle is preferred. Moreover, the light-transmitting display panel 102 has a liquid crystal layer (not shown, and it will be described later) therein. The backlight module 104 is disposed on the above-mentioned second surface 102-2. The image sensing apparatus 110 is disposed at a corner of the display area 102-3 and is configured to sense an image above the display area 102-3. The processing circuit 112 is electrically coupled to the image sensing apparatus 110, so as to receive the image sensed by the image sensing apparatus 110.

The visible light source 106 is configured to emit visible light to the backlight module 104, so that the backlight module 104 can guide the visible light entering the inner thereof to the second surface 102-2. The invisible light source 108 is configured to emit invisible light to the backlight module 104, so that the backlight module 104 can guide the invisible light entering the inner thereof to the second surface 102-2. Moreover, among the four side surfaces of the backlight module 104, the side surface facing the visible light source 106 and the side surface facing the invisible light source 108 are light-transmitting surfaces, and the other two side surfaces are non-light-transmitting surfaces or reflecting surfaces. The operation of the backlight module 104 will be further described by FIG. 2, and the other two side surfaces being non-light-transmitting surfaces is taken as an example.

Figure 2:
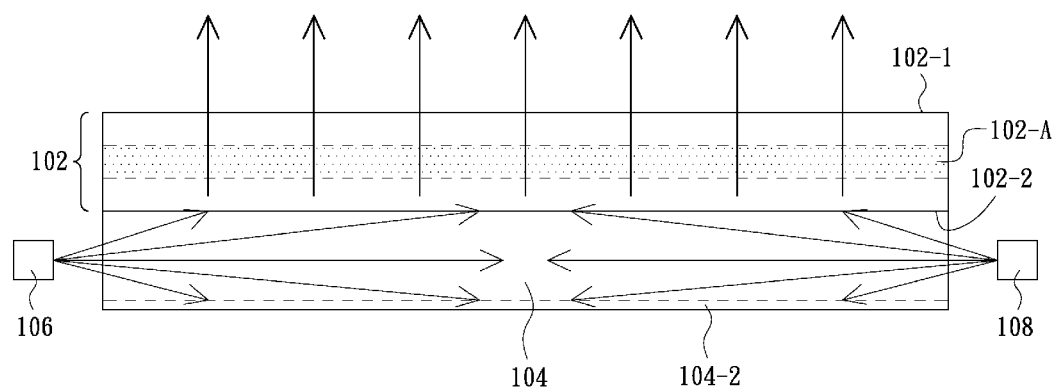
FIG. 2 is an operation schematic view of the backlight module in FIG. 1.

FIG. 2 is an operation schematic view of the backlight module in FIG. 1. The same labels in FIG. 2 and FIG. 1 represent the same object. The label 102-A represents a liquid crystal layer inside the light-transmitting display panel 102, and the label 104-2 represents a reflecting portion inside the backlight module 104. The reflecting portion 104-2 is extended to the two side surfaces of the backlight module 104 which do not face the visible light source 106 and the invisible light source 108, so as to make the two side surfaces be non-light-transmitting surfaces. Furthermore, a portion of the reflecting portion 104-2 which is opposite to the second surface 102-2 of the light-transmitting display panel 102 has a pattern, and the pattern is used for guiding the received light to the second surface 102-2. As shown in FIG. 2, the visible light source 106 emits visible light to the backlight module 104, and the invisible light source 108 emits invisible light to the backlight module 104. Thus, the backlight module 104 can guide the visible light and the invisible light entering the inner thereof to the second surface 102-2 by the pattern of the reflecting portion 104-2, so that the visible light and the invisible light entering the inner of the backlight module 104 can pass through the light-transmitting display panel 102, the liquid crystal layer 102-A inside the light-transmitting display panel 102, and the display area 102-3 on the surface the light-transmitting display panel 102.

Referring to FIG. 1, the invisible light entering the inner of the backlight module 104 can finally pass through the light-transmitting display panel 102, the liquid crystal layer 102-A inside the light-transmitting display panel 102, and the display area 102-3 on the surface the light-transmitting display panel 102. When a pointer 120 is located in the display area 102-3 and reflects the invisible light which passes through the display area 102-3 so that the image sensing apparatus 110 can sense the invisible light reflected by the pointer 120, the processing circuit 112 calculates the position of the pointer 120 related to the display area 102-3 according to the image sensed by the image sensing apparatus 110.

Second Embodiment

From the first embodiment, one skilled in the art should know that even if the visible light source 106 and the invisible light source 108 of the optical touch display apparatus 100 are disposed at the same position, the present invention can also be implemented. Detail description will be further described by FIG. 3.

Figure 3:
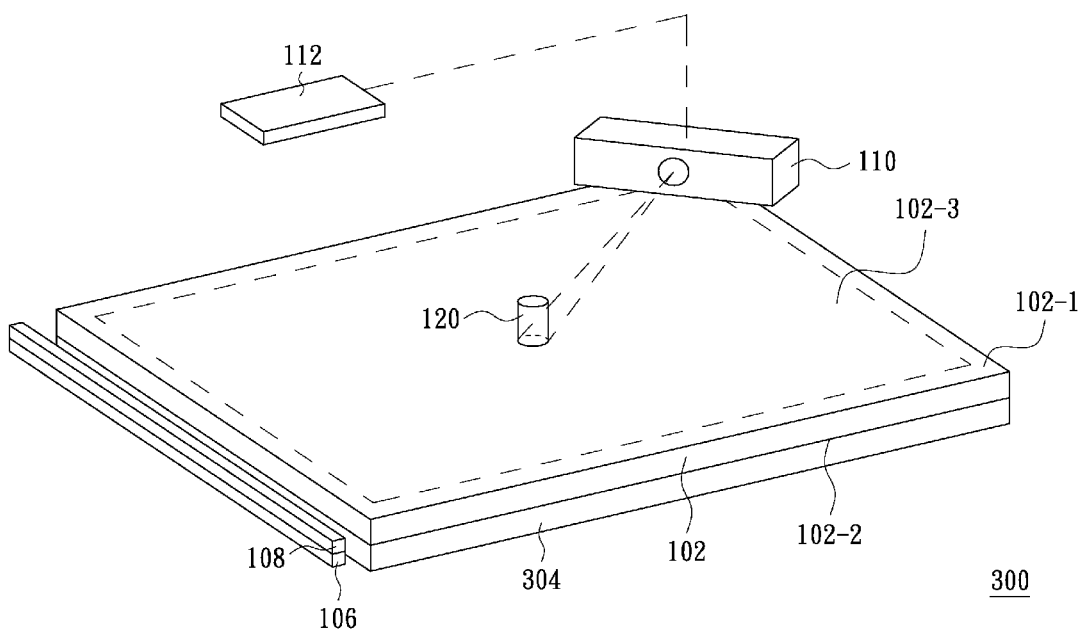
FIG. 3 is a three-dimensional schematic view of an optical touch display apparatus according to another embodiment of the present invention.

FIG. 3 is a three-dimensional schematic view of an optical touch display apparatus according to another embodiment of the present invention. The same labels in FIG. 3 and FIG. 1 represent the same object. Referring to FIG. 3, the difference between the optical touch display apparatus 300 and the above-mentioned optical touch display apparatus 100 is that the visible light source 106 and the invisible light source 108 of the optical touch display apparatus 300 are disposed at the same position. Moreover, the backlight module 304 is different from the above-mentioned backlight module 104. Among the four side surfaces of the backlight module 304, only the side surface facing the visible light source 106 and the invisible light source 108 is light-transmitting surface, and the other three side surfaces are non-light-transmitting surfaces or reflecting surfaces. The operation of the backlight module 304 will be further described by FIG. 4, and the other three side surfaces being non-light-transmitting surfaces is taken as an example.

Figure 4:
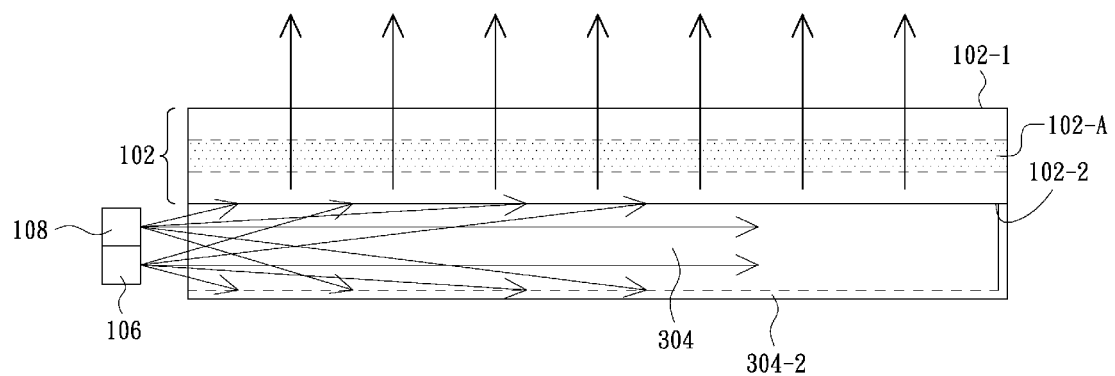
FIG. 4 is an operation schematic view of the backlight module in FIG. 3.

FIG. 4 is an operation schematic view of the backlight module in FIG. 3. The same labels in FIG. 4 and FIG. 3 represent the same object.

The label 102-A represents a liquid crystal layer inside the light-transmitting display panel 102, and the label 304-2 represents a reflecting portion inside the backlight module 304. The reflecting portion 304-2 is extended to the three side surfaces of the backlight module 304 which do not face the visible light source 106 and the invisible light source 108, so as to make the three side surfaces be non-light-transmitting surfaces. Furthermore, a portion of the reflecting portion 304-2 which is opposite to the second surface 102-2 of the light-transmitting display panel 102 has a pattern, and the pattern is used for guiding the received light to the above-mentioned second surface 102-2. As shown in FIG. 4, the visible light source 106 emits visible light to the backlight module 304, and the invisible light source 108 emits invisible light to the backlight module 304. Thus, the backlight module 304 can guide the visible light and the invisible light entering the inner thereof to the second surface 102-2 by the pattern of the reflecting portion 304-2, so that the visible light and the invisible light entering the inner of the backlight module 304 can pass through the light-transmitting display panel 102, the liquid crystal layer 102-A inside the light-transmitting display panel 102, and the display area 102-3 on the surface the light-transmitting display panel 102.

Referring to FIG. 3, the invisible light entering the inner of the backlight module 304 can finally pass through the light-transmitting display panel 102, the liquid crystal layer 102-A inside the light-transmitting display panel 102, and the display area 102-3 on the surface the light-transmitting display panel 102. When a pointer 120 is located in the display area 102-3 and reflects the invisible light which passes through the display area 102-3 so that the image sensing apparatus 110 can sense the invisible light reflected by the pointer 120, the processing circuit 112 calculates the position of the pointer 120 related to the display area 102-3 according to the image sensed by the image sensing apparatus 110.

Third Embodiment

Figure 5:
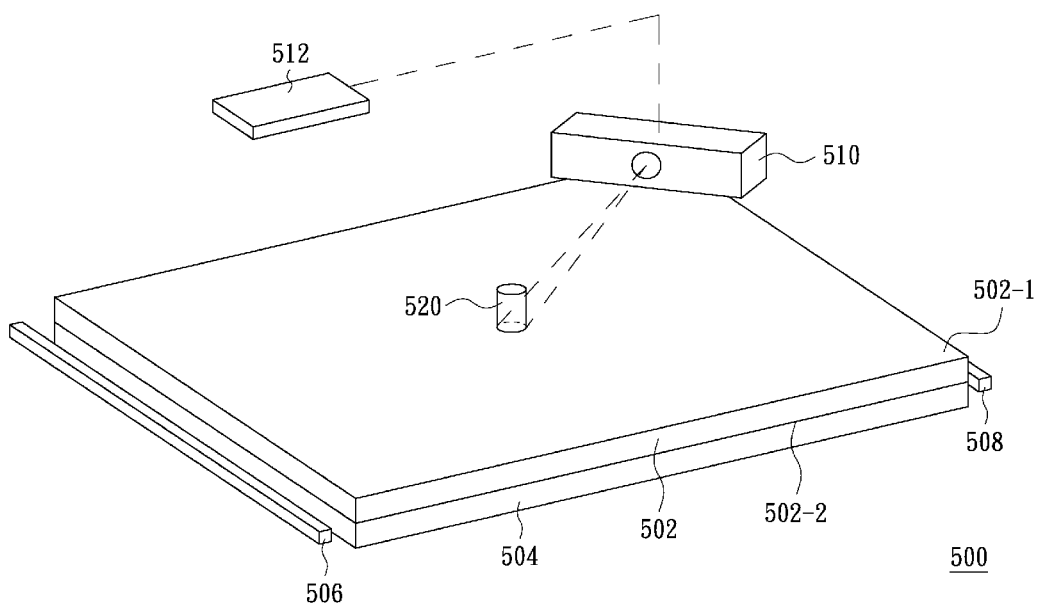
FIG. 5 is a three-dimensional schematic view of an optical operation apparatus according to an embodiment of the present invention.

The present embodiment provides an optical operation apparatus as shown in FIG. 5. FIG. 5 is a three-dimensional schematic view of an optical operation apparatus according to an embodiment of the present invention. Referring to FIG. 5, the optical operation apparatus 500 mainly includes a light-transmitting panel 502, a backlight module 504, a light source 506, an image sensing apparatus 510 and a processing circuit 512. The light-transmitting panel 502 has a first surface 502-1 and a second surface 502-2, and the first surface 502-1 and the second surface 502-2 are opposite to each other. The backlight module 504 is disposed on the second surface 502-2. The light source 506 is configured to provide a first light to the backlight module 504, so that the backlight module 504 can guide the first light entering the inner thereof to the second surface 502-2. The image sensing apparatus 510 is configured to sense an image above the first surface 502-1 so as to generate sensing information. The sensing information can be a complete image or brightness distribution information. The brightness distribution information is the brightness distribution of column pixels of the sensing image. The processing circuit 512 generates object information according to the sensing information. For instance, the processing circuit 512 generates object information related to a pointer 520, and the object information is, for example, the position of the pointer 520 related to the first surface 502-1.

In the present embodiment, the first light provided by the light source 506 is invisible light, and the light source 506 is, for example, an infrared light source. Furthermore, the optical operation apparatus 500 further includes a light source 508. The light source 508 is configured to provide a second light to the backlight module 504, so that the backlight module 504 can guide the second light entering the inner thereof to the second surface 502-2. The second light is visible light.

Since the backlight module 504 has four side surfaces, the light sources 506 and 508 can be respectively disposed beside two side surfaces of the four side surfaces, and the light sources 506, 508 can also be disposed beside the same side surface of the four side surfaces. Among the four side surfaces of the backlight module 504, the side surface facing the light sources 506 and 508 is light-transmitting surface, and the other side surfaces are non-light-transmitting surfaces or reflecting surfaces.

Additionally, a light guide unit (not shown) can be further adopted inside the backlight module 504, so that the first light and the second light entering the backlight module 504 can be guided to the second surface 502-2 by the light guide unit. Further, the light-transmitting panel 502 can also have a liquid crystal layer (not shown).

In summary, compared to the conventional light-transmitting display apparatus, the optical touch display apparatus provided by the present invention further includes the invisible light source, the image sensing apparatus and the processing circuit, and the invisible light emitted by the invisible light source is guided to the surface between the light-transmitting display panel and the backlight module by the conventional backlight module, so that the invisible light can pass through the light-transmitting display panel and the display area thereof. Thus, when a pointer is located in the display area and reflects the invisible light which passes through the display area so that the image sensing apparatus can sense the invisible light reflected by the pointer, the processing circuit calculates the position of the pointer related to the display area according to the image sensed by the image sensing apparatus.

The optical operation apparatus provided by the present invention is consisted of the light-transmitting panel, the backlight module, the light source, the image sensing apparatus and the processing circuit. The light-transmitting panel has the first surface and the second surface, and the first surface and the second surface are opposite to each other. The backlight module is disposed on the second surface. The light source is configured to provide light to the backlight module, so that the backlight module can guide the light entering the inner thereof to the second surface. The image sensing apparatus is configured to sense an image above the first surface, so as to generate sensing information. The processing circuit generates object information according to the sensing information.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch display apparatus comprising:
    a light-transmitting display panel having a first surface and a second surface, the first surface and the second surface being opposite to each other, the first surface having a display area;
    a backlight module disposed on the second surface;
    a visible light source configured to emit visible light to the backlight module so that the backlight module guides the visible light entering the inner thereof to the second surface;
    an invisible light source configured to emit invisible light to the backlight module so that the backlight module guides the invisible light entering the inner thereof to the second surface;
    an image sensing apparatus, a visual field of the image sensing apparatus facing the top of the light-transmitting display panel, the image sensing apparatus being configured to receive the invisible light so as to sense an image above the display area, the invisible light passing through the second surface and the first surface of the light-transmitting display panel and being directly reflected by a pointer located in the display area into the image sensing apparatus; and
    a processing circuit, wherein when the pointer is located in the display area and reflects the invisible light which passes through the second surface and the first surface so that the image sensing apparatus senses the invisible light reflected by the pointer, the processing circuit calculates the position of the pointer related to the display area according to the image sensed by the image sensing apparatus.

2. The optical touch display apparatus according to claim 1, wherein the backlight module has four side surfaces, the visible light source and the invisible light source are disposed beside the same side surface of the four side surfaces or are respectively disposed beside two side surfaces of the four side surfaces, among the four side surfaces of the backlight module, the side surface facing the visible light source and the side surface facing the invisible light source are light-transmitting surfaces, and the other side surfaces are non-light-transmitting surfaces or reflecting surfaces.

3. The optical touch display apparatus according to claim 2, wherein the light-transmitting display panel has a liquid crystal layer therein, the backlight module has a reflecting portion therein, the reflecting portion is extended to the side surfaces of the backlight module which do not face the visible light source and the invisible light source, so as to make the side surfaces be non-light-transmitting surfaces.

4. The optical touch display apparatus according to claim 3, wherein a portion of the reflecting portion which is opposite to the second surface of the light-transmitting display panel has a pattern, and the pattern is used for guiding the received light to the second surface, so that the visible light and the invisible light entering the inner of the backlight module can pass through the light-transmitting display panel, the liquid crystal layer inside the light-transmitting display panel, and the display area.

5. An optical operation apparatus comprising:
    a light-transmitting panel having a first surface and a second surface, the first surface and the second surface being opposite to each other, the first surface having a display area;
    a backlight module disposed on the second surface;
    a first light source configured to provide a first light to the backlight module so that the backlight module guides the first light entering the inner thereof to the second surface;
    an image sensing apparatus, a visual field of the image sensing apparatus facing the top of the light-transmitting panel, the image sensing apparatus being configured to receive the first light so as to sense an image above the first surface and generate sensing information, the first light passing through the second surface and the first surface of the light-transmitting display panel and being directly reflected by a pointer located in the display area into the image sensing apparatus; and
    a processing circuit configured to generate object information according to the sensing information.

6. The optical operation apparatus according to claim 5, wherein the first light provided by the first light source is invisible light, and the first light source comprises an infrared light source.

7. The optical operation apparatus according to claim 6, further comprising a second light source configured to provide a second light to the backlight module so that the backlight module guides the second light entering the inner thereof to the second surface, wherein the second light is visible light.

8. The optical operation apparatus according to claim 5, wherein the light-transmitting panel further has a liquid crystal layer.

9. The optical operation apparatus according to claim 5, wherein the sensing information comprises a complete image or brightness distribution information.

10. The optical operation apparatus according to claim 5, wherein the backlight module has four side surfaces, the first light source is disposed beside a side surface of the four side surfaces, among the four side surfaces of the backlight module, the side surface facing the first light source is light-transmitting surface, and the other side surfaces are non-light-transmitting surfaces or reflecting surfaces.

11. The optical operation apparatus according to claim 10, wherein the backlight module has a light guide unit therein, and the light guide unit is configured to guide the first light entering the backlight module to the second surface.

* * * * *